United States Patent
Maietta (10) Patent No.: US 8,255,578 B2
(45) Date of Patent: Aug. 28, 2012

(54) PREVENTING ACCESS TO A DEVICE FROM AN EXTERNAL INTERFACE

(75) Inventor: Michael Maietta, San Jose, CA (US)

(73) Assignee: Microsoft Corporation, Redmond, WA (US)

( * ) Notice: Subject to any disclaimer, the term of this patent is extended or adjusted under 35 U.S.C. 154(b) by 18 days.

(21) Appl. No.: 12/814,977

(22) Filed: Jun. 14, 2010

(65) Prior Publication Data

US 2011/0307633 A1   Dec. 15, 2011

(51) Int. Cl.
*G06F 3/00* (2006.01)
*G06F 13/00* (2006.01)

(52) U.S. Cl. .......... 710/8; 710/2; 710/5; 710/33; 710/62

(58) Field of Classification Search .................. None
See application file for complete search history.

(56) References Cited

U.S. PATENT DOCUMENTS

| | | | |
|---|---|---|---|
| 7,386,774 B1 | 6/2008 | Chatterjee et al. | |
| 7,600,166 B1 | 10/2009 | Dunn et al. | |
| 2002/0194490 A1* | 12/2002 | Halperin et al. | 713/200 |
| 2006/0129848 A1 | 6/2006 | Paksoy et al. | |
| 2007/0206774 A1* | 9/2007 | Vorenkamp et al. | 379/310 |
| 2008/0109903 A1 | 5/2008 | Werner et al. | |
| 2008/0143373 A1* | 6/2008 | Bonaccio et al. | 326/8 |
| 2008/0282087 A1 | 11/2008 | Stollon et al. | |
| 2009/0055637 A1 | 2/2009 | Holm et al. | |
| 2009/0177830 A1 | 7/2009 | Orion et al. | |
| 2009/0202068 A1 | 8/2009 | Qureshi et al. | |
| 2009/0222652 A1 | 9/2009 | Khan et al. | |

OTHER PUBLICATIONS

EJTAG Specification, Jul. 5, 2005, MIPS Technologies, [online, accessed on Aug. 25, 2011], URL: http://downloads.buffalo.nas-central.org/LS2__MIPSel/DevelopmentTools/JTAG/MD00047-2B-EJTAG-SPC-03.10.pdf.*

Ravi, et al., "Security in embedded systems: Design challenges", Retrieved at >> http://citeseerx.ist.psu.edu/viewdoc/download?doi=10.1.1.83.586&rep=rep1&type=pdf >>, ACM Transactions on Embedded Computing Systems, vol. 3, No. 3, Aug. 2004, pp. 461-491.

\* cited by examiner

*Primary Examiner* — Scott Sun
(74) *Attorney, Agent, or Firm* — Wolfe-SBMC (57) ABSTRACT

Prior to customer use of a device, communication with the device is allowed via multiple pins of an external interface of the device. One or more pins of the multiple pins via which communication with the device is to be prevented during customer use of the device are identified. The one or more pins are monitored, and a remedial action is taken if particular activity is detected on the one or more pins. Various different remedial actions can be taken, such as resetting or disabling the device.

20 Claims, 4 Drawing Sheets

PREVENTING ACCESS TO A DEVICE FROM AN EXTERNAL INTERFACE

BACKGROUND

Devices oftentimes expose interfaces that allow developers and manufacturers of the devices to test and/or evaluate the devices. These interfaces are typically exposed as one or more pins that can be accessed by the developers or manufacturers of the devices. Although these interfaces are useful to the developers or manufacturers of the devices, these interfaces can also be a point of vulnerability for the devices. For example, malicious users can attempt to use these interfaces to obtain access to internal components of the devices and obtain access to data or information to which they were not intended to have access.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, prior to customer use of a device, communication with the device is allowed via multiple pins of an external interface of the device. One or more pins of the multiple pins via which communication with the device is to be prevented during customer use of the device are identified. The one or more pins are monitored, and a remedial action (e.g., resetting the device) is taken if particular activity is detected on the one or more pins.

In accordance with one or more aspects, a signal value detected on a pin of an external interface of a computing device is received. A check is made, based at least in part on the detected signal value, as to whether particular activity is detected on that pin of the external interface. If the particular activity is not detected, then no remedial action is taken in response to the signal value being detected on the pin. However, if the particular activity is detected, then a remedial action is taken to prevent access to the device via the pin of the external interface.

BRIEF DESCRIPTION OF THE DRAWINGS

The same numbers are used throughout the drawings to reference like features.

DETAILED DESCRIPTION

Preventing access to a device from an external interface is discussed herein. The device includes a security module and an external interface. The external interface includes one or more pins that allow external components to access modules or components of the device during development and/or manufacturing of the device. After the device is manufactured and made available to a customer for use, the security module monitors these one or more pins for activity. If particular activity is detected on the pins (such as a particular number of signals being detected on the pins within a particular time duration), then an appropriate remedial action is taken by the security module (such as resetting the device).

References are made herein to digital signatures. Although digital signatures and cryptography are well-known to those skilled in the art, a brief overview of such is included here to assist the reader. In public key cryptography, an entity (such as a user, hardware or software component, a device, a domain, and so forth) has associated with it a public/private key pair. The public key can be made publicly available, but the entity keeps the private key a secret. Without the private key it is computationally very difficult to decrypt data that is encrypted using the public key. So, data can be encrypted by any entity with the public key and only decrypted by an entity with the corresponding private key. Additionally, a digital signature for data can be generated by using the data and the private key. Without the private key it is computationally very difficult to create a signature that can be verified using the public key. Any entity with the public key can use the public key to verify the digital signature by executing a suitable digital signature verification algorithm on the public key, the signature, and the data that was signed.

Figure 1:
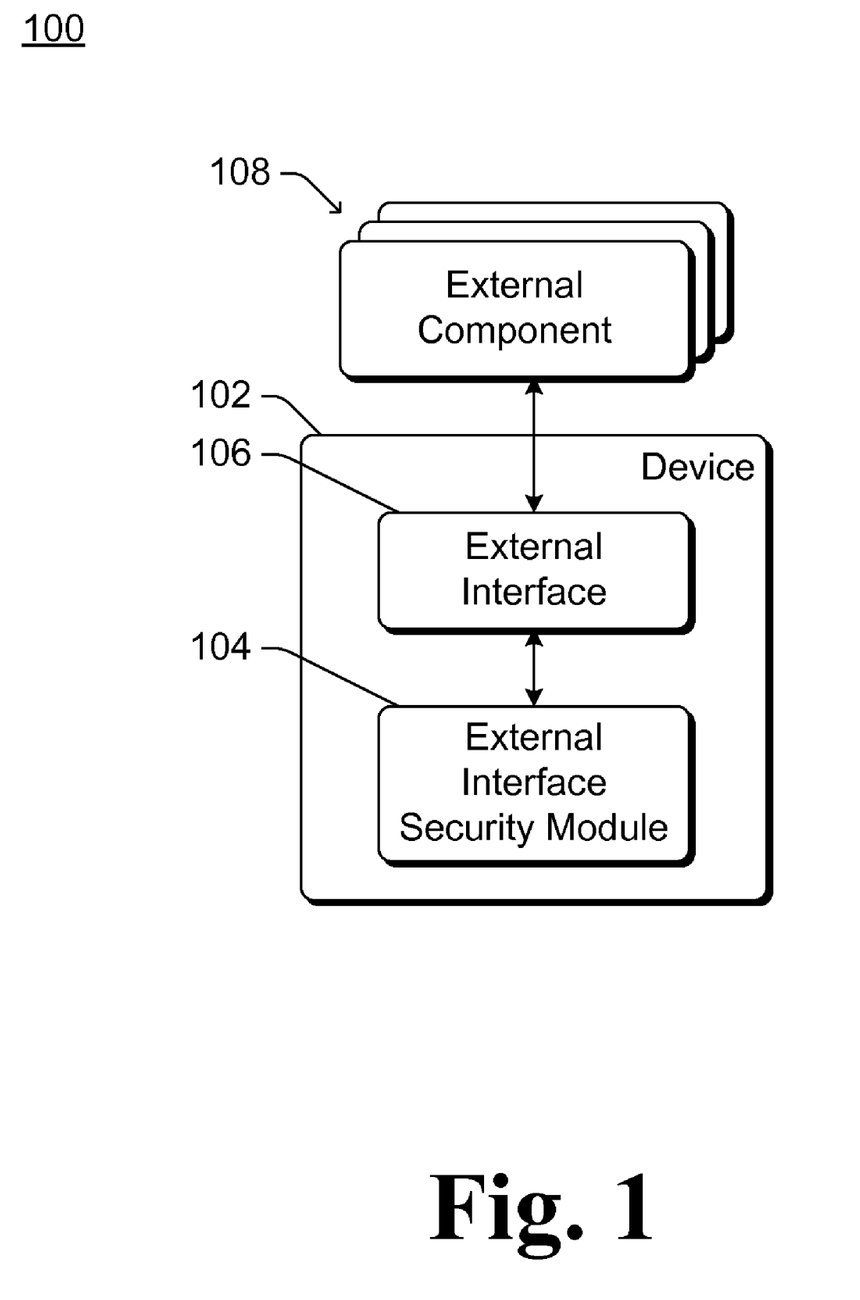
FIG. 1 illustrates an example system implementing the preventing access to a device from an external interface in accordance with one or more embodiments.

FIG. 1 illustrates an example system 100 implementing the preventing access to a device from an external interface in accordance with one or more embodiments. System 100 includes a device 102 having an external interface security module 104 and an external interface 106. Device 102 can be a variety of different types of computing devices, such as a desktop computer, a laptop or netbook computer, a notepad computer, a mobile station, an entertainment appliance, a set-top box communicatively coupled to a display device, a television, a cellular or other wireless phone, a game console, an automotive computer, and so forth. Although not shown in FIG. 1, additional components or modules providing various functionality are also typically included in device 102. A variety of different functionality can be provided by such additional components or modules, such as audio and/or video recording or playback, gaming or other recreational functions, and so forth.

External interface 106 is an interface that is accessible to one or more external components 108, allowing external components 108 to access (subject to security module 104) the various components or modules of device 102. External interface 106 is oftentimes referred to herein as being one or more pins, but external interface 106 can alternatively be other physical contacts or other types of connection mechanisms. Typically one or more pins or contacts are used to communicate control information between an external component 108 and device 102, and one or more pins or contacts are used to communicate data between an external component 108 and device 102. External components 108 oftentimes use external interface 106 for testing or evaluating device 102 during development or manufacturing of device 102. External components 108 can, for example, write data to components or modules of device 102, read data from components or modules of device 102, control the operation of components or modules of device 102, and so forth. In one or more embodiments, external interface 106 is a conventional Enhanced Joint Action Test Group (E-JTAG) port, although it is to be appreciated that external interface 106 can be one or more other ports or interfaces, including test ports or interfaces in accordance with other standards or protocols.

During development or testing of device 102, access to the various components or modules of device 102 via external interface 106 is permitted by external interface security module 104. Subsequently, after device 102 is made available for customer use, access to the various components or modules of device 102 via external interface 106 is prevented by external interface security module 104. Security module 104 monitors signals received via external interface 106, and takes a remedial action if signals matching a particular activity (such as a particular number of signals being detected on the pins within a particular time duration) are received via external interface 106. As discussed in more detail below, a variety of different remedial actions can be taken, such as resetting device 102, disabling device 102, and so forth. External interface security module 104 can be implemented in different manners, such as in software and/or firmware (e.g., code that is executed by a processor of device 102), in hardware, and so forth.

Figure 2:
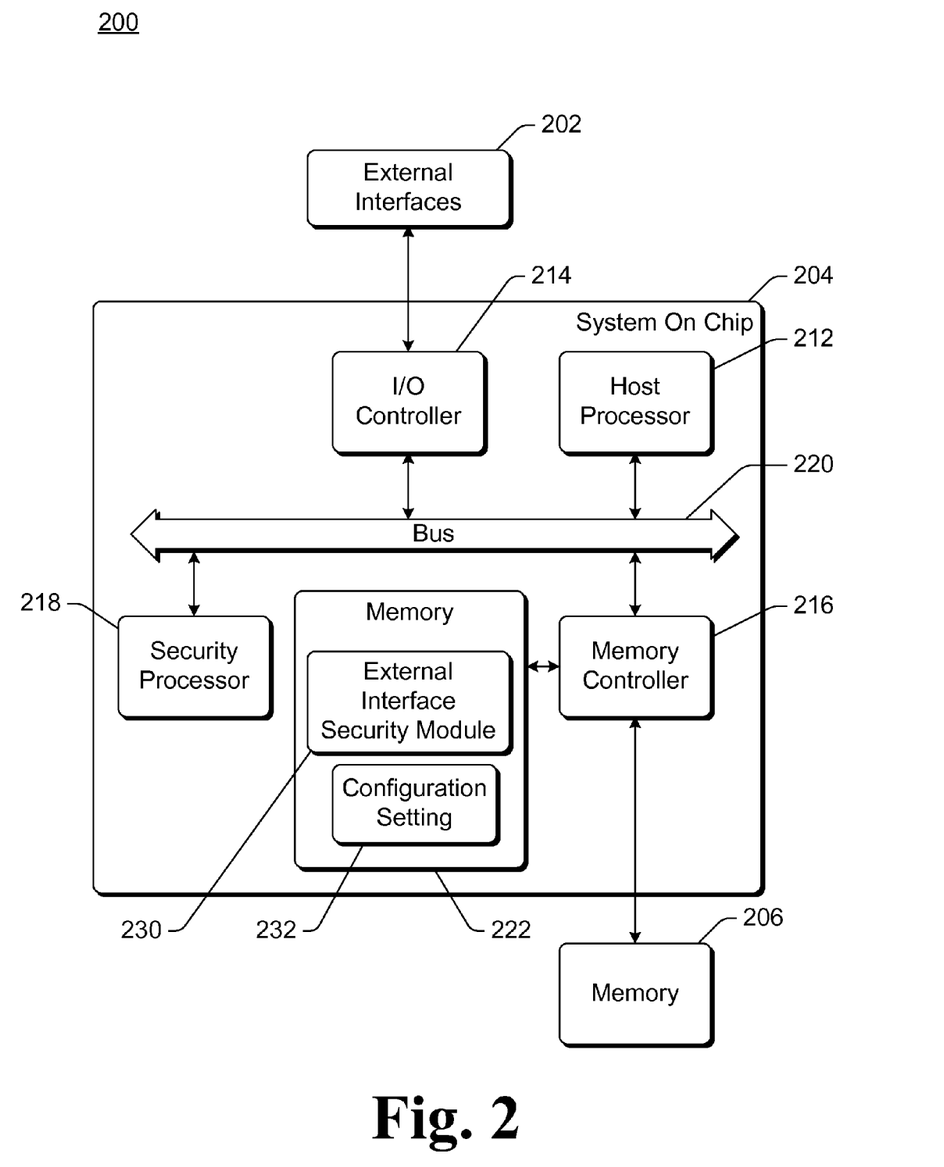
FIG. 2 illustrates an example device implementing the preventing access to a device from an external interface in accordance with one or more embodiments.

FIG. 2 illustrates an example device 200 implementing the preventing access to a device from an external interface in accordance with one or more embodiments. Device 200 can be, for example, a device 102 of FIG. 1. It should be noted that device 200 is an example, and that the preventing access to a device from an external interface can alternatively be implemented using different components and/or modules than are shown in FIG. 2. Device 200 includes one or more external interfaces 202, which can include an external interface 106 of FIG. 1. Device 200 also includes a system on chip (SOC) 204 and a memory 206. System on chip 204 can be a variety of different SOCs, such as a MIPS processor available from MIPS Technologies, Inc. of Sunnyvale, Calif., an ARM processor available from ARM Ltd. of Cambridge, Great Britain, and so forth.

System on chip 204 includes a host processor 212, an input/output (I/O) controller 214, a memory controller 216, and a security processor 218 that can communicate with one another via a bus 220. Although particular components are illustrated in FIG. 2, it is to be appreciated that additional components can be included in system on chip 204 and/or otherwise in device 200. For example, additional controllers or processors can be included, cache memories can be included, multiple security processors 218 can be included, and so forth.

Memory controller 216 accesses memory 206, which is implemented within device 200 but external to system on chip 204. Memory 206 can include volatile media (such as random access memory (RAM)) and/or nonvolatile media (such as read only memory (ROM), Flash memory, and so forth). Memory controller 216 also accesses memory 222, which is included as part of system on chip 204. Memory 222 typically includes nonvolatile media, and can also optionally include volatile media.

Memory controller 216 allows different components of system on chip 204, such as host processor 212 and security processor 218, to write to and/or read from memory 206 and/or memory 222. Data and/or instructions can be read from and/or written to memory 206 and/or memory 222, such as instructions of a program to be executed by security processor 218 or host processor 212, data for a program being executed by security processor 218 or host processor 212, and so forth.

Host processor 212 executes one or more programs that provide various functionality of device 200, such as audio and/or video recording and/or playback, gaming and/or other recreational functions, and so forth. Security processor 218 executes one or more programs that provide security functionality for system on chip 204. This security functionality can include, for example, encryption and/or decryption of data, verifying digital signatures of instructions (e.g., programs or modules) that are included in memory 206 or memory 222 so that only verified instructions are executed by security processor 218 and/or host processor 212, and so forth. Security processor 218 also executes external interface security module 230, as discussed in more detail below.

I/O controller 214 allows one or more external components or devices (such as external components 108) to communicate with components or modules of device 200. I/O controller 214 operates in a conventional manner to identify signals received via the pins or other connection mechanism of external interfaces 202, and to detect signal values based on the identified signals. These signals can be, for example, changes in voltage levels that indicate digital values of 0 or digital values of 1. In response to detecting a signal value on a pin or other connection mechanism of external interfaces 202, I/O controller 214 provides the detected signal value to another component of system on chip 204, typically host processor 212 or security processor 218. In one or more embodiments, I/O controller 214 is configured to provide all detected signals to the same component, such as security processor 218. In other embodiments, I/O controller 214 is configured to provide signals detected on a first set of pins of external interfaces 202 to security processor 218, and signals detected on a second set of pins of external interfaces 202 to host processor 212. The first set of pins of external interfaces 202 are monitored by external interface security module 230 for particular activity as discussed in more detail below, while the second set of pins of external interfaces 202 are not monitored by external interface security module 230 for particular activity.

External interfaces 202 can include one or more pins used as an E-JTAG port, as well as one or more other pins used for other communication. In one or more embodiments, I/O controller 214 is configured to provide signal values detected on at least some of the one or more pins used as the E-JTAG port to security processor 218, and to provide signal values detected on other pins to host processor 212. Security processor 218 can be configured to permit communication with external components or devices via certain parts (e.g., pins) of external interfaces 202 during customer use of the device, but prevent communication with external components or devices via other parts (e.g., pins) of external interfaces 202, as discussed in more detail below.

Memory 222 includes an external interface security module 230 and a configuration setting 232. Although external interface security module 230 and configuration setting 232 are illustrated as being stored in memory 222, alternatively, security module 230 and/or configuration setting 232 can be stored elsewhere in system on chip 204. For example, security module 230 and/or configuration setting 232 can be stored in memory internal to security processor 218. Alternatively, security module 230 and/or configuration setting 232 can be stored in another component or module in device 200, but external to system on chip 204, to which security processor 218 has access.

In one or more embodiments, when device 200 is powered-on or otherwise reset, security processor 218 obtains and begins executing instructions from memory 222. These instructions can be stored in, for example, nonvolatile memory to ensure that they are not tampered with by a malicious user or component. These initial instructions that are executed are also referred to as boot code or boot instructions. Security processor 218 executes the boot code, which can include allowing additional instructions (such as an operating system or other program) to be executed by host processor 212. These additional instructions can be obtained from nonvolatile memory to ensure they have not been tampered with by a malicious user or component, or alternatively these additional instructions can be verified as having not been altered (e.g., based on a digital signature associated with the additional instructions) prior to security processor 218 allowing the additional instructions to be executed by host processor 212.

Security processor 218 also executes, optionally as part of the boot code, code (e.g., instructions and data) that is external interface security module 230. Because security processor 218 executes security module 230, it is to be appreciated that the operations performed by security module 230 are the operations performed by security processor 218 executing security module 230. External interface security module 230 can monitor the activity on one or more pins of external interfaces 202 by receiving or otherwise obtaining the signal values detected by I/O controller 214 on one or more pins of external interfaces 202. External interface security module 230 can receive the signal values detected on one or more pins of external interfaces 202 from I/O controller 214 in a variety of different manners, such as polling I/O controller 214 for the detected signal values on the one or more pins, receiving an interrupt or other signal from I/O controller 214 when I/O controller 214 detects a signal value on a pin of an external interface 202, and so forth. Host processor 212 can similarly receive the signal values detected on one or more pins of external interfaces 202 from I/O controller 214 in a variety of different manners.

External interface security module 230 can execute in a monitoring enabled mode or a monitoring disabled mode. Which of these two modes module 230 executes in is determined by configuration setting 232. If configuration setting 232 is set (e.g., has a value of "1", has a value of "true", has a value of "enable", etc.), then module 230 executes in a monitoring enabled mode. However, if configuration setting 232 is cleared or not set (e.g., has a value of "0", has a value of "false", has a value of "disable", etc.), then module 230 executes in a monitoring disabled mode.

When security processor 218 begins executing external interface security module 230, module 230 accesses configuration setting 232 to determine whether to execute in the monitoring enabled mode or monitoring disabled mode. External interface security module 230 executes in the monitoring enabled mode if configuration setting 232 is set, and executes in the monitoring disabled mode if configuration setting 232 is not set. External interface security module 230 typically does not provide an evaluation period during which a component or module can indicate that security module 230 is to execute in the monitoring disabled mode even though the configuration setting 232 is set. External interface security module 230 also typically does not provide an opportunity for a user or other device to authenticate itself in order to have security module 230 execute in the monitoring disabled mode even though the configuration setting 232 is set. Rather, if the configuration setting 232 is set then external interface security module 230 executes in the monitoring enabled mode regardless of any other inputs or configuration settings.

When in the monitoring disabled mode, external interface security module 230 does not monitor or otherwise passes on signal values detected on pins of external interfaces 202. Any detected signal values received from I/O controller 214 are passed by security processor 218 to host processor 212 (or alternatively another component or module of device 200). Configuration setting 232 is not set when system on chip 204 is fabricated, so during the development and/or manufacturing of device 200 the signals received via external interfaces 202 are ignored by security processor 218. This allows, for example, external components to access device 200 via an E-JTAG port without interference from security module 230.

Configuration setting 232 is typically set by a manufacturer of device 200 prior to making device 200 available to a customer (e.g., prior to shipping device 200 to a customer, prior to providing device 200 to a wholesaler or reseller, etc.). The manufacturer of device 200 can set configuration setting 232 in different manners, such as via an external component accessing system on chip via an external interface 202, via instructions running on security processor 218, as part of the manufacturing process itself, and so forth. Thus, security processor 218 executes external interface security module 230 in the monitoring enabled mode the first time the customer powers on device 200. Alternatively, configuration setting 232 can be set in different manners, such as by external interface security module 230 (or other instructions of boot code) the first time security module 230 (or the other instructions of the boot code) is executed.

When in the monitoring enabled mode, external interface security module 230 monitors one or more pins of external interfaces 202, and the particular one or more pins that are monitored can vary by implementation. Security module 230 can be configured with or otherwise have access to an indication of which one or more pins are to be monitored. For example, an indication of the one or more pins that are to be monitored can be included in security module 230, an indication of the one or more pins that are to be monitored can be included in a configuration setting stored in memory 222, and so forth. The indication of the one or more pins that are to be monitored can take a variety of different forms. For example, the indication of the one or more pins that are to be monitored can be a mask value having one bit associated with each of multiple pins of external interfaces 202. A particular bit of the mask value is set (e.g., has a value of "1", has a value of "true", has a value of "monitor", etc.) if the associated pin is to be monitored, and is cleared or not set (e.g., has a value of "0", has a value of "false", has a value of "no monitor", etc.), if the associated pin is not to be monitored. Alternatively, I/O controller 214 can be configured with or otherwise have access to an indication of the one or more pins that are to be monitored, and can provide an indication to external interface security module 230 (e.g., via polling or interrupt as discussed above) of only signal values detected on the one or more pins that are to be monitored.

When in the monitoring enabled mode, if external interface security module 230 is not monitoring a particular pin but receives a signal value detected on that pin by I/O controller 214, then security module 230 passes on the received signal value to another component or module. Security module 230 can pass any such detected signal values received from I/O controller 214 to host processor 212 (or alternatively another component or module of device 200).

When monitoring a particular pin of external interface 202, external interface security module 230 monitors signal values detected on that particular pin for particular activity. This particular activity can take a variety of different forms. In one or more embodiments, the particular activity is any signal value detected on the particular pin (e.g., the particular activity is a single signal value detected on the particular pin). In other embodiments, the particular activity is at least a threshold number of signal values (e.g., 3-5 signal values) detected within a threshold time duration (e.g., 1 minute). In other embodiments, different filters can be applied to identify different types of activity as the particular activity, such as particular data patterns (e.g., particular sequences of detected signal values), particular data patterns within a threshold time duration, particular data patterns detected on different pins of external interfaces 202, at least a threshold number of signal values being detected across multiple pins of external interfaces 202 within a threshold time duration, and so forth.

External interface security module 230 can monitor multiple different pins of external interfaces 202 for the same activity, or alternatively monitor different pins for different activity. For example, a first pin of external interfaces 202 can be monitored for any signal value detected on the first pin, while a second pin of external interfaces 202 can be monitored to detect at least a threshold number of signal values within a threshold time duration (e.g., 1 minute).

If, while monitoring a particular pin of external interface 202, the particular activity is detected, then external interface security module 230 takes a remedial action. In one or more embodiments, this remedial action is to reset device 200. Resetting device 200 can be done in a variety of different manners, such as by sending a reset command to host processor 212, asserting a reset signal or pin on bus 220, asserting another reset signal or pin within system on chip 204 or otherwise in device 200, and so forth.

Alternatively, this remedial action can be other actions. For example, this remedial action can be to disable device 200. Device 200 can be disabled in a variety of different manners, such as by adding a configuration setting to memory 222 that indicates to boot code that no additional instructions are to be executed by security processor 218 and/or host processor 212, by asserting a disable signal that alters the hardware of system on chip 204 (e.g., by disabling a particular pin or line), and so forth. By way of further example, this remedial action can be to send a message to a remote device (e.g., via the Internet or another network), record the particular activity that was detected and the particular pin on which the particular activity was detected, deleting data from memory 222 and/or memory 206, and so forth.

Additionally, multiple remedial actions can be taken in response to detecting the particular activity on a particular pin of external interface 202. For example, both a message can be sent to a remote device and device 200 can be reset in response to detecting the particular activity on a particular pin of external interface 202.

It should be noted that oftentimes restarting device 200 after device 200 has been reset is a time-consuming process. For example, restarting device 200 can take several minutes. Device 200 is reset each time the particular activity is detected while external interface security module 230 is monitoring a pin of external interfaces 202. Thus, if a malicious user were to attempt to communicate with device 200 via the one or more pins of external interfaces 202 that are being monitored (and the particular activity on those one or more pins were to be detected by external interface security module 230), then device 200 is reset. This resetting helps ensure the integrity of device 200 and the data stored thereon (e.g., in memory 206 and/or memory 222) because it would be a very time-consuming process for a malicious user to attempt to gain access to modules or components of device 200 via those one or more pins of external interfaces 202 that are being monitored (e.g., several minutes for each attempt). However, a typical (non-malicious) customer would not typically attempt to communicate with the device via the one or more pins of external interfaces 202 that are being monitored, and thus the typical (non-malicious) customer would not encounter such resetting of the device.

Additionally, it should be noted that external interface security module 230 need not monitor all the pins of external interfaces 202. Rather, security module 230 is configured with or otherwise has access to an indication of which one or more pins are to be monitored as discussed above. This monitoring of only particular pins of external interfaces 202 allows different manufacturers to use external interfaces 202 in different manners. For example, a first manufacturer may desire to use a particular pin of an E-JTAG port for a different purpose after testing has been completed. Thus, for devices manufactured by the first manufacturer, that particular pin would not be monitored for the particular activity by security module 230, although the other pins of the E-JTAG port would be monitored for the particular activity (and remedial action taken if the particular activity is detected). A second manufacturer, however, may not desire to use any of the pins of the E-JTAG port for a different purpose after testing has been completed. Thus, for devices manufactured by the second manufacturer, all the pins of the E-JTAG port would be monitored for the particular activity (and remedial action taken if the particular activity is detected).

In one or more embodiments, configuration setting 232 is stored in a protected portion of system on chip 204 that can only be accessed by security module 230. This protected portion can be, for example, a protected portion of memory 222, a register internal to security processor 218, and so forth. No other instructions are permitted to write to this protected portion, and thus no other instructions are permitted to alter configuration setting 232. Alternatively, configuration setting 232 can be stored in a register or other memory that is a write-once register or memory. Thus, once the configuration setting 232 is set to indicate that external interface security module 230 is to execute in the monitoring enabled mode, the configuration setting 232 cannot be cleared.

Additionally, in one or more embodiments, external interface security module 230 does not include instructions that write to configuration setting 232. If it is desired to clear configuration setting 232 after configuration setting 232 has been set, a reconfiguration program is provided to security processor 218. Such a reconfiguration program can be provided to device 200 and security processor 218 in a variety of different conventional manners. External interface security module 230 authenticates the reconfiguration program (e.g., verifies that the reconfiguration program has a particular digital signature from a trusted source, such as the manufacturer or developer of device 200), and executes the reconfiguration program only if the reconfiguration program is authenticated. This reconfiguration program, when executed by security processor 218, clears configuration setting 232.

In one or more embodiments, external interface security module 230 and configuration setting 232 are included in device 200 during the manufacturing process. Accordingly, when a customer receives device 200, the device already includes both external interface security module 230 and configuration setting 232. Alternatively, external interface security module 230 and configuration setting 232 can be installed on device 200 after the customer receives device 200. External interface security module 230 and configuration setting 232 can be provided to and installed on device 200 in a variety of different conventional manners. Thus, a device 200 that is already being used by a customer can be updated to include the preventing access to a device from an external interface discussed herein.

Although external interface security module 230 is discussed in FIG. 2 as being code that is executed by security processor 218, external interface security module 230 can alternatively be implemented in different manners. For example, external interface security module 230 can be implemented as a hardware component separate from security processor 218.

Figure 3:
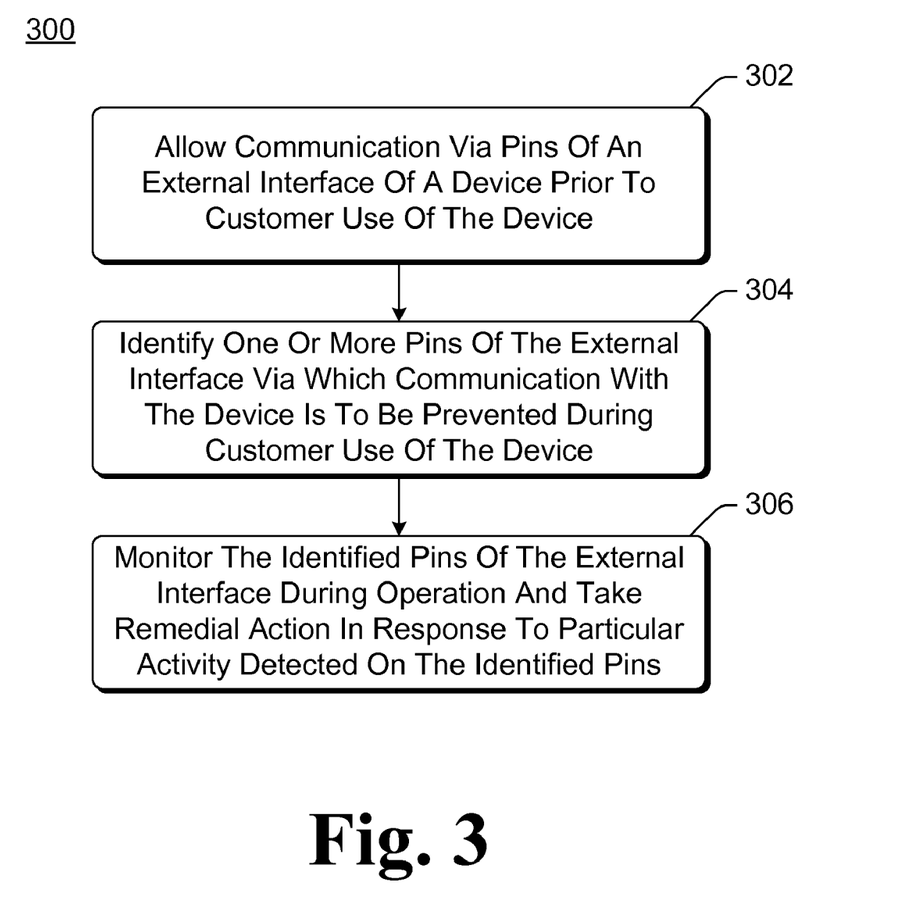
FIG. 3 is a flowchart illustrating an example process for preventing access to a device from an external interface in accordance with one or more embodiments.

FIG. 3 is a flowchart illustrating an example process 300 for preventing access to a device from an external interface in accordance with one or more embodiments. Process 300 is carried out by an external interface security module of a device, such as external interface security module 104 of FIG. 1 or external interface security module 230 of FIG. 2, and can be implemented in software, firmware, hardware, or combinations thereof. Process 300 is shown as a set of acts and is not limited to the order shown for performing the operations of the various acts. Process 300 is an example process for preventing access to a device from an external interface; additional discussions of preventing access to a device from an external interface are included herein with reference to different figures.

In process 300, communication via pins of an external interface of a device is allowed prior to customer use of the device (act 302). This communication allows for testing or other evaluation of the device during, for example, the manufacturing and/or development of the device as discussed above.

One or more pins of the external interface via which communication with the device is to be prevented during customer use of the device are identified (act 304). An indication of these one or more pins is known to or accessible to the external interface security module implementing process 300 as discussed above.

The one or more pins identified in act 304 are monitored during operation of the device that includes the external interface security module implementing process 300, and remedial action is taken in response to particular activity being detected on the identified pins (act 306). The external interface security module implementing process 300 can monitor the pins for a variety of different activities and can take a variety of different remedial actions as discussed above.

Figure 4:
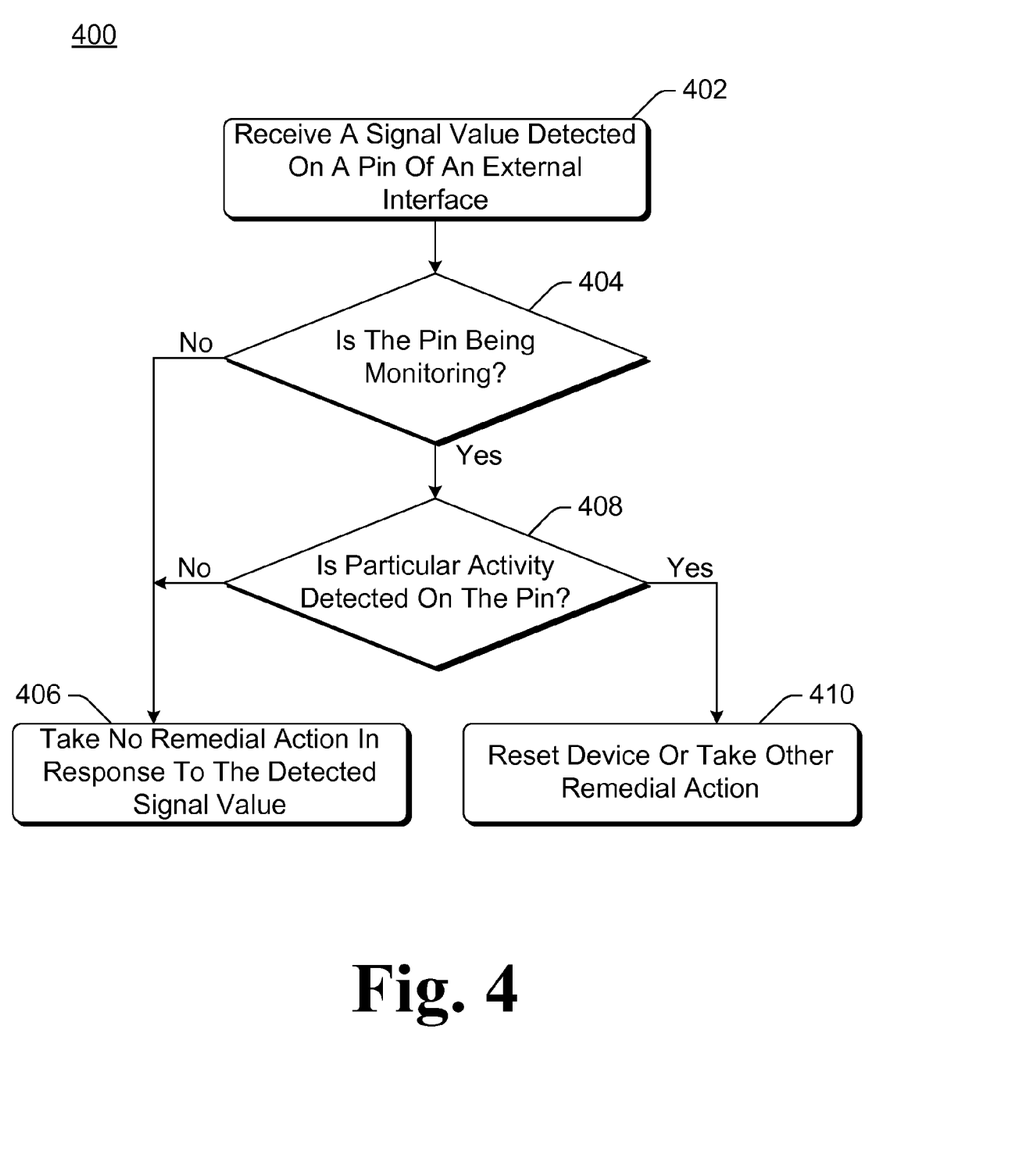
FIG. 4 is a flowchart illustrating another example process for preventing access to a device from an external interface in accordance with one or more embodiments.

FIG. 4 is a flowchart illustrating another example process 400 for preventing access to a device from an external interface in accordance with one or more embodiments. Process 400 is carried out by an external interface security module of a device, such as external interface security module 104 of FIG. 1 or external interface security module 230 of FIG. 2, and can be implemented in software, firmware, hardware, or combinations thereof. Process 400 is shown as a set of acts and is not limited to the order shown for performing the operations of the various acts. Process 400 is an example process for preventing access to a device from an external interface; additional discussions of preventing access to a device from an external interface are included herein with reference to different figures.

In process 400, a signal value detected on a pin of an external interface is received (act 402). This signal value can be received in different manners as discussed above, such as by the external interface security module implementing process 400 polling an I/O controller, the external interface security module implementing process 400 receiving an interrupt from an I/O controller, and so forth. The external interface can be an E-JTAG port or other interface as discussed above.

In response to receiving the signal value, a check is made as to whether the pin on which the signal value was detected is being monitored (act 404). One or more pins, but not necessarily all pins, of the external interface are monitored as discussed above.

If the signal value was detected on a pin that is not being monitored, then no remedial action is taken in response to the signal (act 406).

However, if the signal value was detected on a pin that is being monitored, then a check is made as to whether particular activity is detected on the pin (act 408). This particular activity can be a variety of different activities as discussed above, such as any signal value detected on the particular pin, at least a threshold number of signal values being detected on the pin within a threshold time duration, and so forth. It should be noted that, dependent on the particular activity being checked for, one or more additional detected signal values may be received in order to perform the check in act 408.

If the particular activity is not detected on the pin, then no remedial action is taken in response to the signal (act 406). However, if the particular activity is detected on the pin, then remedial action is taken in response to the particular activity being detected on the pin (act 410). This remedial action can be resetting the device that includes external interface security module implementing process 400 or alternatively other remedial action as discussed above.

Thus, it can be seen that the preventing access to a device from an external interface discussed herein allows a device to be manufactured with communication via a test port, such as an E-JTAG port, being allowed. The device can be tested or otherwise evaluated during the manufacturing process and prior to customer use of the device. Then, prior to making the device available for customer use, one or more pins of the test port via which communication with the device are to be prevented are identified. These one or more pins are monitored during customer use of the device, and remedial action is taken if particular activity is detected on these one or more pins. Thus, if a malicious user were to attempt to communicate with the device via the identified one or more pins of the test port, the device would be reset (or other remedial action taken). As a typical (non-malicious) customer does not typically attempt to communicate with the device via the test port, the typical (non-malicious) customer would not encounter such resetting of the device during their use of the device.

Returning to FIG. 2, reference is made to external interface security module 230 checking configuration setting 232 to determine whether to operate in a monitoring enabled mode or monitoring disabled mode. Alternatively, external interface security module 230 can be configured to always operate in a monitoring enabled mode. For example, external interface security module 230 can be added to system on chip 204 at the final stages of the manufacturing process (after any testing or other evaluation has been completed). In such situations, configuration setting 232 need not be included in device 200.

The techniques discussed herein can be implemented in hardware, software, firmware, or combinations thereof. When implemented at least in part in software and/or firmware, instructions are executed by one or more processors, such as security processor 218. It is to be appreciated that different instructions can be stored in different components of device 200, such as in security processor 218, in various cache memories of security processor 218, in other cache memories of device 200 (not shown), on other computer readable media, and so forth. Additionally, it is to be appreciated that the location where instructions are stored in device 200 can change over time.

Various techniques may be described herein in the general context of software or modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable memory devices, further description of which may be found with reference to FIG. 2. The features of the preventing access to a device from an external interface techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method implemented in a device, the method comprising:
allowing communication with the device via multiple pins of an external interface of the device prior to customer use of the device;
identifying one or more pins of the multiple pins via which communication with the device is to be prevented during customer use of the device;
accessing a configuration setting of the device to determine whether the device is operating in a monitoring enabled mode or a monitoring disabled mode, the configuration setting allowing switching between the two modes to be reversible responsive to a user authentication; and
monitoring the one or more pins and taking a remedial action if particular activity is detected on the one or more pins, the remedial action comprising asserting a signal to reset the device.

2. A method as recited in claim 1, wherein the particular activity comprises at least a threshold number of signal values being detected on the pin within a threshold time duration.

3. A method as recited in claim 1, wherein the particular activity comprises detecting any signal value on the pin.

4. A method as recited in claim 1, wherein the remedial action further comprises sending a message to a remote device.

5. A method as recited in claim 1, wherein the remedial action further comprises disabling the device.

6. A method as recited in claim 1, wherein monitoring the one or more pins and taking the remedial action comprises monitoring the one or more pins and taking the remedial action only if the device is operating in the monitoring enabled mode.

7. A method as recited in claim 6, further comprising monitoring the one or more pins and taking the remedial action in response to the configuration setting of the device indicating that the device is operating in the monitoring enabled mode and regardless of any other inputs to the device.

8. A method as recited in claim 1, wherein the external interface comprises an Enhanced Joint Action Test Group (E-JTAG) port.

9. A method as recited in claim 8, wherein the one or more pins are a first set of one or more pins of the multiple pins of the E-JTAG port, and wherein a second set of the multiple pins of the E-JTAG port are not included in the one or more pins.

10. A method as recited in claim 1, wherein the method is implemented in an external interface security module executed by a security processor of the device.

11. A method as recited in claim 10, wherein the security processor is part of a system on chip of the device, the system on chip further including a host processor and a memory.

12. One or more computer storage media having stored thereon multiple instructions that, when executed by one or more processors of a device, cause the one or more processors to:
receive a signal value detected on a contact of an external interface of the computing device;
access a configuration setting of the device to determine whether the device is operating in a monitoring enabled mode or a monitoring disabled mode, the configuration setting allowing switching between the two modes to be reversible responsive to a user authentication;
responsive to determining the device is operating in monitoring enabled mode, check, based at least in part on the signal value, whether a particular activity is detected on the contact;
take no remedial action in response to the signal value detected on the contact if the check indicates that the particular activity is not detected; and
take a remedial action to prevent access to the device via the contact if the check indicates that the particular activity is detected, the remedial action comprising resetting the device without requiring user intervention.

13. One or more computer storage media as recited in claim 12, wherein the particular activity comprises at least a threshold number of signal values being detected on the contact within a threshold time duration.

14. One or more computer storage media as recited in claim 12, wherein the particular activity comprises detecting any signal value on the contact.

15. One or more computer storage media as recited in claim 12, wherein the external interface comprises an Enhanced Joint Action Test Group (E-JTAG) port.

16. One or more computer storage media as recited in claim 12, wherein the remedial action further comprises disabling the device.

17. One or more computer storage media as recited in claim 12, wherein to check whether the particular activity is detected on the contact is further based at least in part on one or more signal values detected on one or more additional contacts of the external interface.

18. One or more computer storage media as recited in claim 12, wherein the external interface includes a first set of contacts and a second set of contacts, and wherein the multiple instructions further cause the one or more processors to check whether the particular activity is detected on the contact only if the contact is one of the first set of contacts.

19. One or more computer storage media having stored thereon multiple instructions that implement an external interface security module and that, when executed by one or more processors of a device, cause the one or more processors to:
    receive a signal value detected on a pin of an external interface of the computing device;
    check, in response to receiving the signal value detected on the pin, whether the pin is being monitored, wherein the check as to whether the pin is being monitored is performed only when the external interface security module is executing in a monitoring enabled mode, the monitoring enabled mode configured to be reversible such that a cleared monitoring enabled mode value will result in the external interface security module executing in a monitoring disabled mode; the cleared monitoring enabled mode value configured to be selected by a user that authenticates with the device;
    if the pin is not being monitored or the external interface security module is executing in the monitoring disabled mode, then take no remedial action; and
    if the pin is being monitored then,
        check whether a particular activity is detected on the pin, wherein the particular activity comprises at least a threshold number of signal values being detected on the pin within a threshold time duration,
        take no remedial action in response to receiving the signal value detected on the pin if the check indicates that the particular activity is not detected, and
        responsive to the check indicating that the particular activity is detected, send a reset command causing the device to reset.

20. One or more computer storage media as recited in claim 12, wherein the remedial action further comprises sending a message to a remote device.

* * * * *